Inventor:
Paul H. Kydd,
by *Leo J. Martini*
His Attorney.

Inventor:
Paul H. Kydd,
by *Leo S. Martin*
His Attorney.

Inventor:
Paul H. Kydd,
His Attorney.

United States Patent Office 3,446,481
Patented May 27, 1969

3,446,481
LIQUID COOLED TURBINE ROTOR
Paul H. Kydd, Scotia, N.Y., assignor to General Electric
Company, a corporation of New York
Filed Mar. 24, 1967, Ser. No. 625,745
Int. Cl. F01d 5/04, 5/18, 25/12
U.S. Cl. 253—39.15                                    18 Claims

ABSTRACT OF THE DISCLOSURE

Several structural arrangements are shown for the use of liquids to cool the buckets, bucket platforms, rotor disc rim and, if present, the bucket shroud of a gas turbine by the outwardly directed distribution of cooling liquid from within the turbine. The cooling liquid is: (a) sprayed against the rotor disc from a plurality of stationary spray nozzles at least some of which are supported by one or more nozzle diaphragms, (b) collected in at least one confining circumferentially disposed gutter region under either or both blade platform projections until such liquid is brought up to rotational speed, (c) dispersed under the influence of centrifugal force into and along passageways in the bucket platforms and into and through at least one open-ended cavity extending in the direction of the radial dimension of each of the turbine buckets, and then finally ejected from the open distal end of each bucket.

---

The portions of a gas turbine in which the need for cooling is the most critical are the combustor, the turbine nozzles and the turbine buckets. The most difficult cooling problem is posed by the latter, because they are mounted on the turbine rotor disc, a rotating element. A further difficulty arises from the fact that not only do the turbine buckets have thin trailing edges, but the leading edges are also sharp. Since the heat loads on these thin sections are very severe the cooling must be highly uniform and effective to prevent large temperature gradients and associated thermal stresses. In addition, the problem of introducing a liquid coolant into, and removing coolant from, the high-speed rotor disc without entailing excessive leakage of coolant, are formidable ones, because of the tremendous centrifugal and Coriolis forces encountered.

Compressed air is the most readily available coolant and the one most easily introduced into the rotor structure. Usually compressor discharge air is conducted to the roots of the turbine buckets and discharged through radially-extending holes in the buckets passing along the span thereof. When distributed in this manner, cooling is effected by convection and, since air has a rather low heat capacity and is normally available only at an elevated temperature in high compression machines, its value as a coolant is low, and yet, its cost in terms of lost compressive power is high. The maximum turbine inlet temperature that may be employed in gas turbine units relying upon convection air cooling is about 1400° K. (2050° F.).

Air may be employed still more effectively as a cooling medium when applied in transpiration cooling wherein the air is injected from within the bucket into the boundary layer of hot gas, which passes over the surface of the turbine buckets. The injection of the air is accomplished by passing the air through many fine holes extending through the bucket shell and thereby provides an insulating air layer between the surface of each turbine bucket and the hot gases. Unfortunately, this cooling technique is difficult in that it necessitates the drilling of a large number of fine holes in intricate superalloy castings, which drilling increases the cost of the turbine buckets considerably.

Convection cooling by the use of gases other than air, as for example hydrogen, helium or steam, provides better heat transfer inside the turbine buckets, because of the increased thermal conductivity of such gases, however, such a system must be maintained absolutely gas-tight thereby posing an extremely difficult design problem in addition to that of disposing of the heat once it has been transferred to the gas cooling medium.

The amount of heat which must be removed from the turbine buckets and the adjacent supporting structure is determined by both the film coefficient and the extent of the area of the surfaces being cooled. For this reason, it is preferable to reduce the surface area to be cooled and to increase the loading on each turbine stage beyond the values of stage loading now employed in conventional gas turbines.

In order to attain high stage loading with high operating efficiency, the peripheral speed of the turbine rotor must be increased, and this increase in turn increases the centrifugal stress on the turbine buckets. Any such increase in centrifugal stress can be accommodated only by reducing the temperature of the turbine buckets well below that temperature normally tolerated in gas turbine practice at which lower temperature the bucket material has substantially higher strength. Assuming that this temperature reduction can be effected, the heat load per stage can be increased, because of the higher relative velocities and the larger temperature difference employed, while the total heat load is reduced by reducing the number of turbine stages. Cooling the turbine buckets by transpiration sufficiently to retain for the entire turbine rotor a strength in the order of 100,000 p.s.i. would require such a large amount of cooling air that a serious reduction in aerodynamic efficiency would result. Obviously, cooling by convection with gases cannot possibly produce the requisite cooling capacity. However, convection may be successfully employed providing very high heat transfer coefficients can be obtained and such high heat transfer coefficients can be obtained by the use of liquid cooling.

Liquid cooling of gas turbines is broadly old, both forced and natural convection water-cooled turbines having been tested. One early attempt used hollow turbine rotors with "blind" holes extending radially outwardly into the turbine buckets to within a very short distance of the tips. Another approach employed the distribution of liquid via radially directed bores to circumferentially extending cooling channels in the rotor disc rim with a return flow via a second set of radially directed bores. Still another approach was the distribution of liquid from a supply thereof near the rotor axis to a rim manifold for redistribution therefrom to injection orifices venting through the rim, into the hot gases to the suction side of each bucket. Sprays of the cooling liquid ejected thereby contact the exterior bucket surfaces. Unfortunately, each of the above proposals has presented serious difficulties in construction and in maintenance, the maintenance problems being due to the plugging up of conduits with deposits of foreign matter and the consequent building up of undesirably high liquid pressures.

It is, therefore, a prime object of this invention to provide a structure and a method of operation for liquid cooling of a near-stoichiometric fired, high stage loaded gas turbine offering positive control of the cooling liquid flow and obviating the deficiencies of liquid cooling systems known heretofore.

It is another object of this invention to provide an arrangement for very effectively cooling by the use of liquids the blade platform, the blades and shroud of gas turbines operating at peripheral speeds in excess of about 1500 feet per second and at turbine inlet temperatures in excess of about 2100° F. with virtually no limit on the cooling liquid flow rate.

The aforementioned and other objects are achieved by means of an internal liquid spray cooling arrangement wherein the cooling liquid, preferably water, is sprayed at low pressure on the side(s) of the turbine disc from one or more nozzles supported by one or more nozzle diaphragms and is trapped in at least one circumferentially disposed gutter located below the turbine bucket platform. The liquid so trapped is brought up to rotational speed of the turbine disc, whereupon it is able to drain outwardly under the influence of centrifugal force via holes through the bucket platform communicating with one or more cavities open at both ends and extending in a generally radial direction through the turbine bucket. By having the distal end of each turbine bucket open, the cooling liquid can be freely displaced from the interior of the bucket under the influence of centrifugal force permitting replacement by fresh quantities of cooling liquid. If a shroud ring is employed, provisions must be made to cool this element, therefore the liquid is ejected into an annular chamber defined by the movable shroud ring and the stationary casing with or without the interposition of labyrinth seals. Much of the emerging liquid strikes against one or more stationary vane members located in the annular chamber angularly positioned so as to direct the liquid spray striking thereagainst back against the shroud in order to effect cooling thereof. Obviously this automatic shroud cooling can be augmented or replaced by spray nozzles in the annular casing directed at the shroud.

The exact nature of this invention as well as other objects and advantages thereof will be readily apparent from consideration from the following specification relating to the annexed drawings in which.

Figure 1:
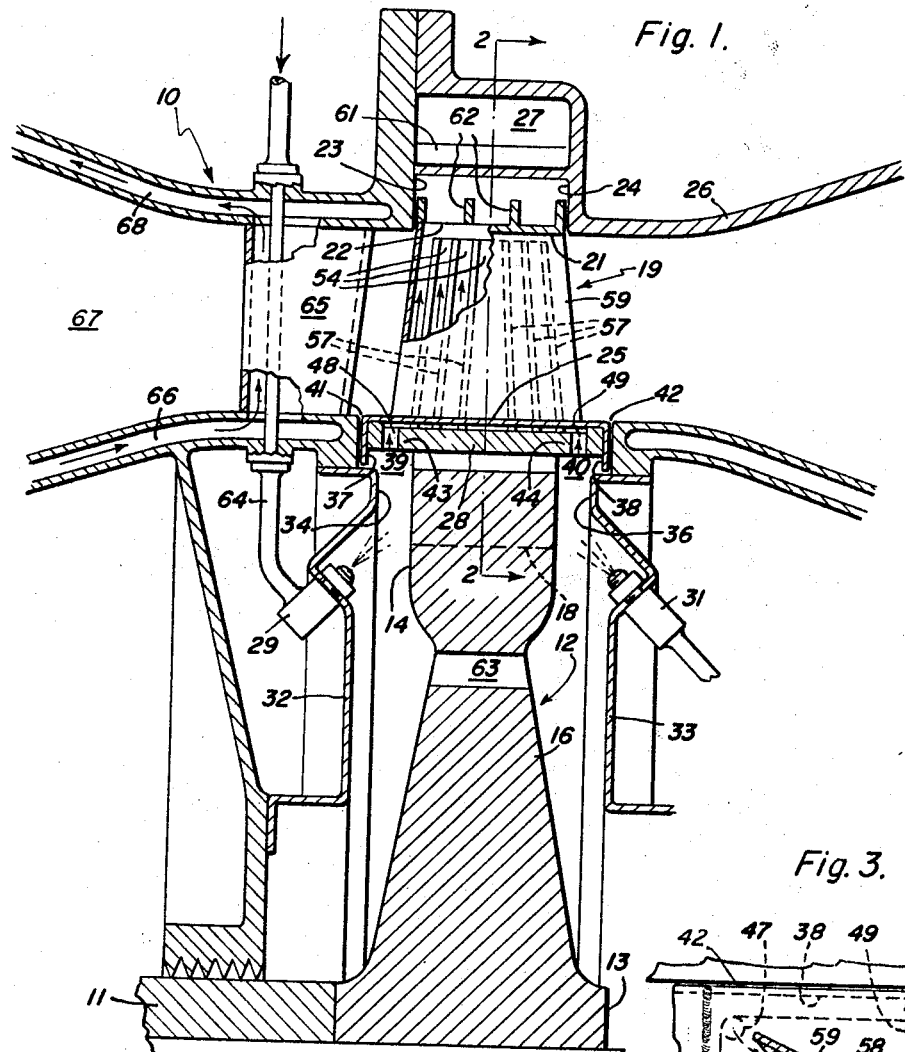
FIG. 1 is a transverse sectional view through a gas turbine showing the rotor disc supporting a turbine bucket and embodying the liquid cooling system in accordance with this invention.
Figure 2:
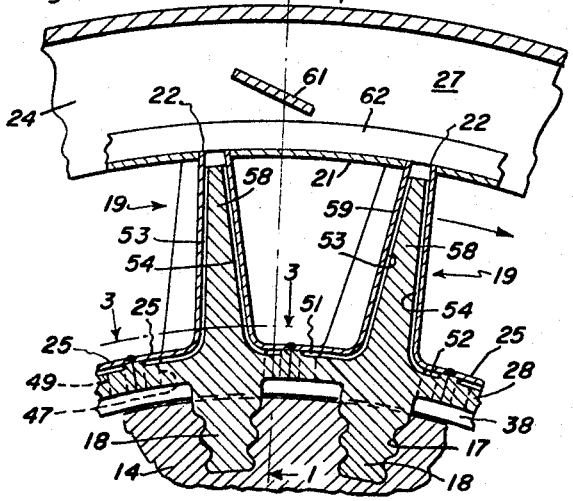
FIG. 2 is a sectional view taken on line 2—2 of FIG. 2.
Figure 3:
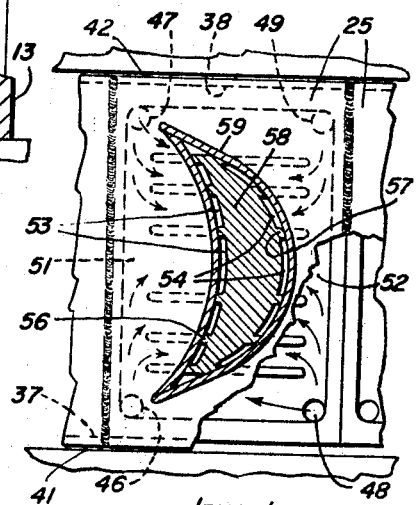
FIG. 3 is a sectional view taken on line 3—3 of FIG. 2.

Referring to FIGS. 1, 2 and 3 there is shown, by way of example, part of a gas turbine structure 10, including rotor shaft 11 terminating in turbine rotor 12 projecting radially from the shaft axis. As shown, rotor 12 is composed of three sections; hub 13, rim section 14 and a tapered connecting section 16 between the hub and rim sections. The rim section 14 has a series of transverse recesses 17 formed therein, each of which receives the dovetailing root 18 of a turbine bucket, or blade 19. Shroud ring 21 affixed to bucket tips 22 reduces bucket vibration. The edges of shroud ring 21 may be made to fit very closely (0.005″ or less) to walls 23, 24 of casing 26 to define annular chamber 27, because of the very effective cooling produced by the practice of this invention. As will be explained in greater detail below cooling liquid will be distributed from within turbine 10 passing outwardly through the open ends of buckets 19 and into the annular chamber 27. In the event it is desired to minimize any leakage of cooling liquid from annular chamber 27 into the hot gas stream, the edges of shroud 21 may be made to engage a labyrith seal (not shown) at the casing walls 23, 24.

The cooling apparatus will be described referring to water as the cooling medium, although any readily available liquid may be used. For example, in a jet engine a liquid fuel may be used as the coolant, the coolant being sprayed (after absorbing heat in the manner described herein) and burned downstream for thrust augmentation.

The cooling requirements are most critical in bucket platform skin 25, buckets 19 and shroud 21 which are exposed to the hot gas stream and cooling action is accomplished in accordance with this invention by spraying water at low pressure in a generally radially outward direction from stationary cooling nozzles 29, 31 supported on stationary annular discs 32, 33, respectively. It is possible that in some turbine constructions it will not be possible to locate a low pressure nozzle on each side of rotor disc 12, however, it is preferred to impinge the cooling water on both sides of rotor disc 12. In the arrangement shown the low pressure water leaving nozzles 29, 31 impinges on the sides of disc 12 in the vicinity of rim section 14 and over the underside of bucket platforms 28. Nozzle-supporting members 32, 33 are provided with projecting annular ridges 34, 36, respectively. Also, each bucket platform 28 is provided with downwardly extending lip portions 37, 38, which in the construction shown are down-turned sheet metal continuations of the bucket platform skin 25.

The annular lips 37, 38 together with platform 28 define gutter regions 39, 40. In the construction shown, annular ridges 34, 36 also cooperate with lips 37, 38 defining gutters 39, 40 and directing the coolant into the gutters and away from clearance spaces 41, 42, although this additional structure is not a critical element. Cooling water introduced through nozzles 29, 31 is directed radially outwardly and accumulates under overlapping portions 43, 44 of bucket platform 28 in the gutters 39, 40. While in gutter regions 39, 40 the accumulating liquid cools the parts with which it comes in contact and is retained until it has been accelerated to the prevailing disc rim velocity. After the cooling water in gutters 39, 40 has been so accelerated, this water continually drains from regions 39, 40 in a radially outward direction under the influence of centrifugal force through bucket platforms 28 and thence into and through turbine buckets 19.

In the construction shown in FIGS. 1, 2 and 3 this outward distribution of cooling water takes place through inlets 46, 47, 48, 49 venting through the underside of portions 43, 44 of each platform 28. From the inlets 46, 47, the water (still under the influence of centrifugal force) enters manifold 51. Similarly, water from inlets 48, 49 enters manifold 52. The manifolds 51, 52 are in flow communication with passages 53, 54, respectively, these passages being open at both ends and defined by the series of ribs 56, 57 forming part of core portion 58 of bucket 19. Sheet metal skin 59 covering core 58 and welded to ribs 56, 57 completes the definition of passages 53, 54. As with all other turbine buckets employed in the practice of this invention the cooling water and steam generated therefrom are freely expelled from the interior of the buckets through the open ends of the buckets and in this manner the buildup of hydrostatic forces is obviated, removing any necessity of designing for the application of such loads to the rotating structure.

As shown in FIGS. 1 and 2 part of the water and steam slung out of the outer open ends of passages 53, 54 will strike against and cool the casing walls defining annular chamber 27 and the rest of the ejected fluid mixture will strike against stationary vanes 61 located in chamber 27 at intervals around the annular extent thereof. By this expedient a considerable portion of the ejected water is deflected and returned against the outer surface of shroud 21 cooling both the rim thereof and reinforcing ribs 62 provided to insure that these well-cooled stiffeners will be able to support the rim surface adequately.

The construction described hereinabove is particularly suitable to liquid cooling, because plugging of the water inlets 46–49, manifolds 51, 52 and passages 53, 54 is obviated by provision of a forceful scrubbing action by the fast moving water acting under the influence of the high centrifugal field. Most important, each load-bearing rotating part is separated from the hot gas stream by a liquid-cooled sheet metal skin, thereby minimizing temperature gradients. This provision is particularly important in the case of turbine buckets 19. Further, any leaks that may occur in the sheet metal skin 59 will not be of particular consequence, passages 53, 54 being open at both ends and pressure differences being small at all points in the cooling system. Even partial destruction of metal skin 59 will not prevent the gas turbine from functioning and it should not be necessary to remove the turbine bucket to make repairs to the skin 59.

In those constructions (such as shown in FIG. 1) in which a bucket shroud is employed, cooling must be provided for the shroud. Thus, if the deflecting vanes 61 are insufficient or, if alternate cooling devices are preferred, cooling water may be sprayed inwardly from the casing into chamber 27 in the general arrangement disclosed in U.S. patent application Ser. No. 625,837—Kydd, filed concurrently herewith and assigned to the assignee of the instant application.

In order to minimize the possibility of loss of water between bucket platforms 28 and the stationary structure (spaces 41, 42) to each side thereof, very tight clearances may be employed (of the order of 0.005 inch or less). Also, to equalize the pressure on opposite sides of rotor disc 59 and prevent having water blown back out of downstream inlets 47, 49, a plurality of pressure relief holes 63 are provided through rotor disc 12.

Cooling water supply conduits, such as pipe 64, leading to nozzles 29, 31 pass through stationary elements, such as nozzle partitions 65, that are easily cooled by conventional methods. As an illustration, cooling water is conducted through passage 66 extending around combustor 67 and enters the nozzle partition 65 to which stationary annular disc 32 is affixed. Thereafter, the cooling water is conducted through nozzle partitions 65 and then returned via passage 68 as shown.

Alternate construction (not shown) may be used to replace the pressure relief holes 63 shown in FIG. 1. In such an arrangement the radially inwardly extending annular lip 37 would form one side of an annular recess formed in the underside of platforms 28. A radially outwardly extending flange affixed to or formed integrally with disc 32 would project into the aforementioned recess enabling the formation of an annular liquid seal both to prevent leakage and to prevent creation of a pressure difference across the disc.

Figure 4:
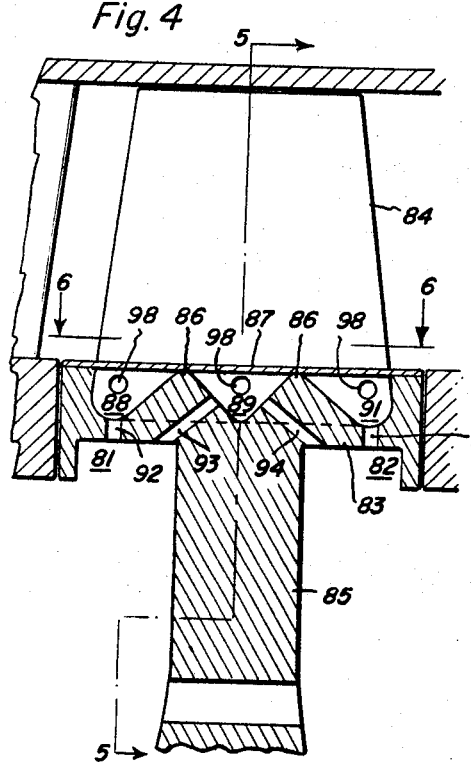
FIG. 4 is a transverse sectional view through a turbine rotor disc showing a second construction for distributing outwardly directed liquid into a bucket platform of modified design from the acceleration gutters.
Figure 5:
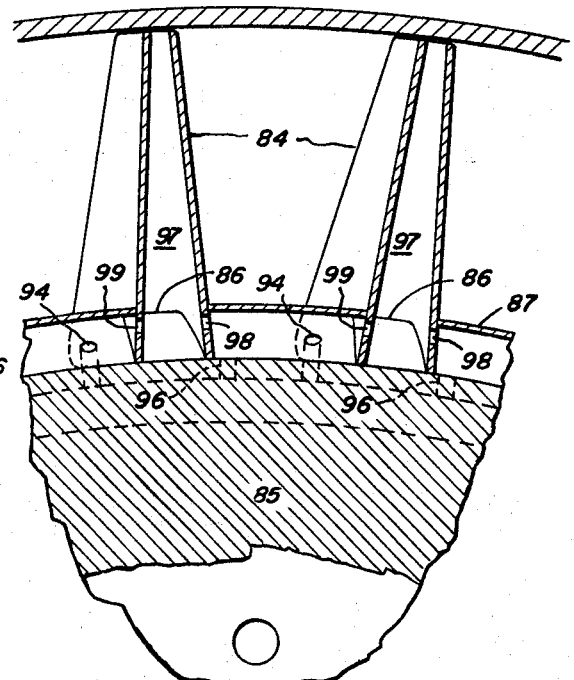
FIG. 5 is a sectional view taken on line 5—5 of FIG. 4.
Figure 6:
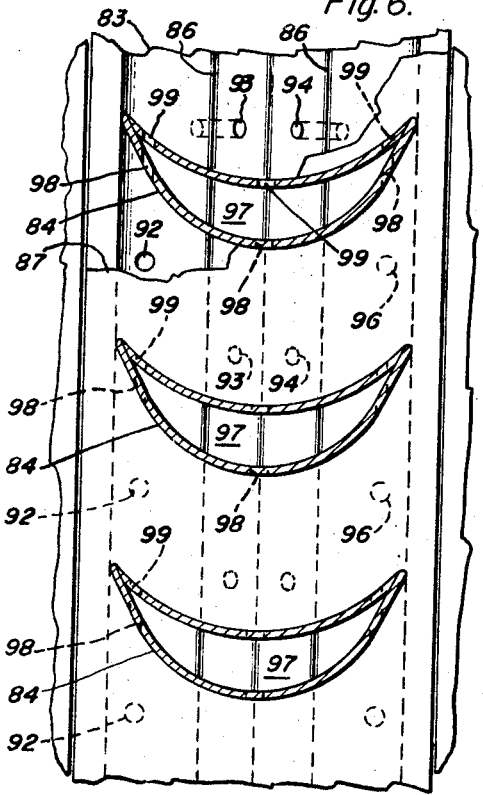
FIG. 6 is a developed plan view of the bucket cascade of FIG. 4 illustrating one variation of the distribution channel system for cooling liquid to and into the turbine buckets.
Figure 7:
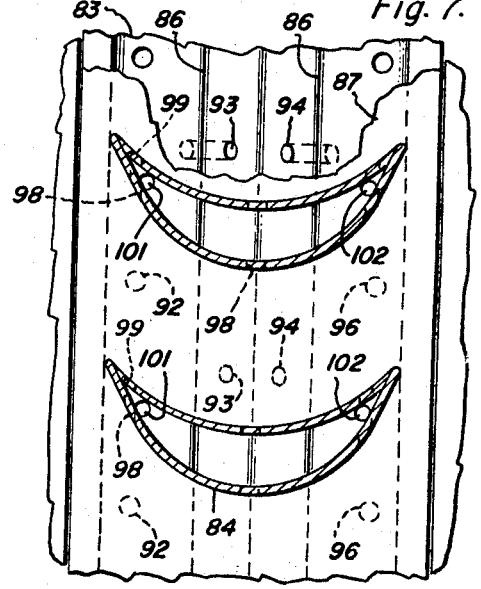
FIG. 7 is a developed plan view of a bucket cascade similar to that of FIG. 4 illustrating a second variation for the distribution channel system for cooling liquid to and into the turbine buckets.

FIGS. 4, 5 and 6 illustrate another distribution channel arrangement for the passage of cooling water from gutter regions 81, 82 into and through the interior of bucket platforms 83 in transit to and through the turbine buckets 84. In the structure shown platform 83 is cast as an integral part of rotor disc 85 and, as shown, has a series of ridges 86 and valleys formed in the upper surface thereof. Buckets 84 fit into slots cut into ridges 86 and are brazed to platform 83. Platform skin 87 is affixed to the ridges 86 of platform 83 as shown thereby defining passageways 88, 89, 91. Inlet holes 92, 93, 94, 96 distribute the cooling water from gutters 81, 82 to passageways 88, 89 and 91 as shown. The passageways 88 89, 91 in turn are in flow communication with a pair of cavities 97, one at either end therof via cooling holes 98 and 99. If desired, additional inlet holes 101, 102 as shown in FIG. 7 may be provided extending from the underside of platform 83 directly into the interior of the leading and trailing edges of buckets 84. The aforementioned distribution network can be further simplified by providing cross-over channels (not shown) transverse of ridges 86 leading from passageways 88 and 91 to passageway 89 and eliminating inlet holes 93, 94, as well as those cooling holes 98 and 99 shown leading from passageways 88 and 91 through the shell of buckets 84 into each cavity 97. Similarly, inlet holes 101 and 102 are optional. With the simplified construction, cooling water may be admitted for distribution from one side only of the rotor disc 103 and substantial cooling of platform 83 can still be achieved.

Of course, the same distribution channel arrangement as is shown in FIGS. 4, 5 and 6 can be employed with turbine construction wherein individual turbine buckets are affixed to the rotor disc 85 by means of dovetailing root construction.

In case it is desired to cool the casing downstream of the turbine rotor and there is no deterrent to the introduction of the cooling liquid to the stream of hot gases (motive fluid), the structure of FIG. 1 may be modified to omit shroud 21 and annular chamber 27, whereby water and steam ejected from the open ends of the turbine buckets will bathe the adjacent casing wall and the cooling mixture continues passing over and cooling the surface of the casing wall for some distance downstream.

Figure 8:
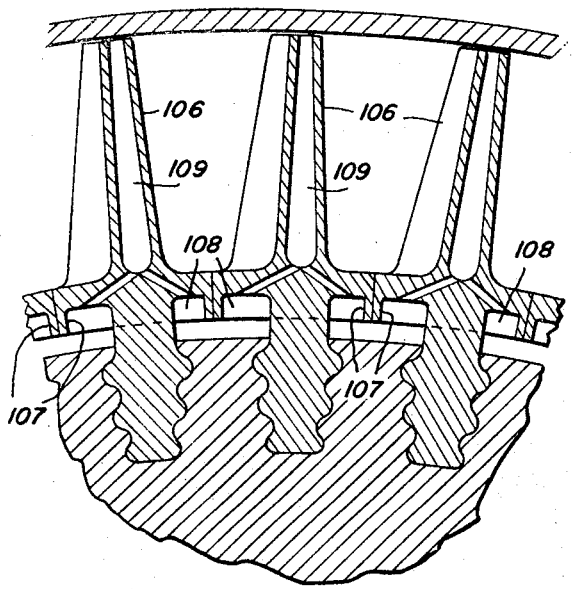
FIG. 8 is a sectional view showing forged or cast turbine bucket and platform construction having an integrally formed gutter.
Figure 10:
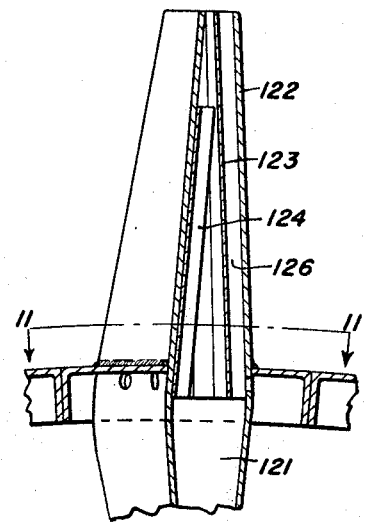
FIG. 10 is a sectional view showing internal construction for hollow turbine buckets to insure proper distribution of outgoing cooling liquid.
Figure 9:
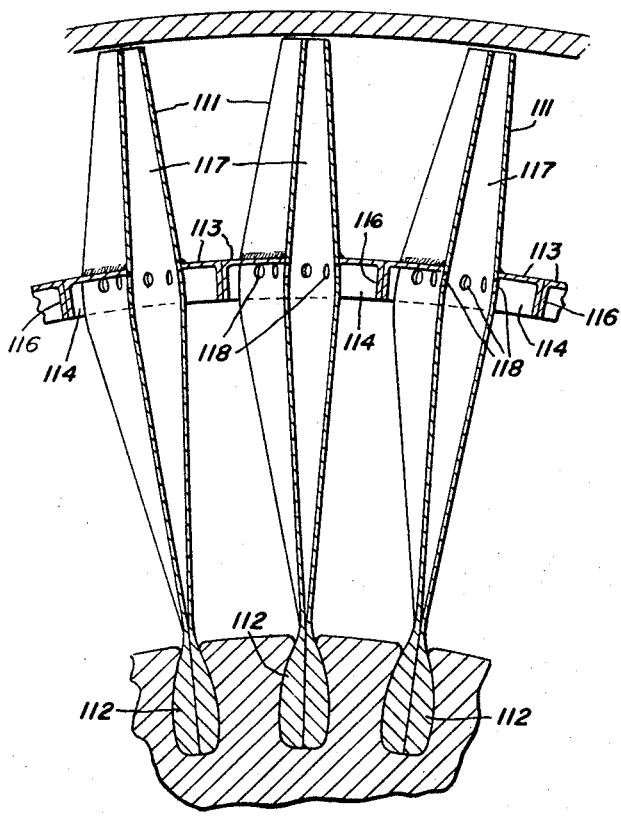
FIG. 9 is a sectional view showing long shank sheet metal bucket and platform construction with an integral gutter.
Figure 11:
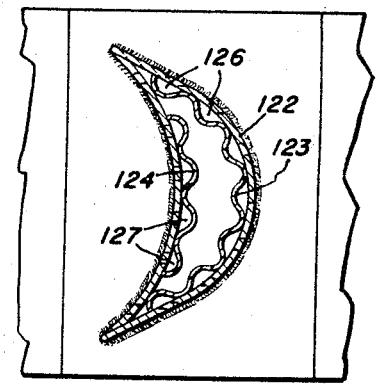
FIG. 11 is a sectional view taken on line 11—11 of FIG. 10.

By supplying each individual turbine bucket with a downwardly extending skirt around the entire perimeter of the bucket platform, each turbine bucket may be supplied with an integral gutter region in the manner shown in FIGS. 8, 9, and 10. Thus, in FIG. 8 the forged or cast hollow bucket 106 is provided with downwardly extending skirt portion 107 defining gutter region 108 from which cooling liquid is distributed to the cavity 109 by the passages shown. The long shank sheet metal bucket configuration disclosed in FIG. 9 is of particular advantage for reducing the mass of the assembled turbine rotor. Sheet metal bucket 111 would be affixed to the rotor disc at the thickened root portions 112 thereof. A sheet metal bucket platform 113 is brazed or welded to each sheet metal bucket 111. These platforms 113 are arranged in abutting relationship. Integral gutter region 114 is defined by the downwardly extending sides 116 of platform 113. The water received by and contained in gutter 114 passes into cavity 117 under the influence of centrifugal force through drain holes 118. A similar arrangement is shown in FIG. 10 modified in that cavity 121 of bucket 122 contains the wriggle strip configurations 123 and 124, which provide passages 126 and 127, respectively, in order to insure that a suitable amount of the cooling liquid entering cavity 121 will be prevented from transferring from the suction side to the pressure side of bucket 122.

Thus, with the constructions and modifications shown maximum utilization of the cooling capabilities of a liquid medium, such as water, may be realized. Thus, when water is used for cooling, practically all the water (even at substantial flow rates) will be converted to steam.

As a result of this very effective cooling action it now becomes possible to operafe at turbine inlet temperatures of approximately 2400° K. (about 3900° F.) with stoichiometric firing and thereby increase the specific output by a factor of four.

Other modifications and variations of this invention are possible in the light of the above teachings. It is, therefore, to be understood that within the scope of the appended claims, this invention may be practiced otherwise than as specifically described.

What I claim as new and desire to secure by Letters Patent of the United States is:

1. A gas turbine construction comprising in combination:
   (a) a casing,
   (b) a shaft mounted for rotation in said casing,
   (c) a turbine disc mounted on said shaft for rotation therewith, said turbine disc extending substantially perpendicular to the axis of said shaft,
   (d) open-ended turbine buckets mounted on the outer rim of said turbine disc and extending in a generally radially outward direction from said rim,
   (e) a platform having overhanging portions projecting laterally to either side of said rim and extending circumferentially of said turbine disc with the upstream circumferentially-extending edge of said overhanging portions being adjacent the surface of the stationary structure supporting the nozzle partitions,
   (f) stationary nozzle means at least some of which are supported by internally located portions of said stationary structure, said nozzle means being located radially inwardly of said platform and being oriented to direct liquid passed therethrough under relatively low pressure in a radially outward direction into the volume generally defined by said stationary structure, turbine disc and overhanging portions,
   (g) means for supplying cooling liquid to said stationary nozzle means for exit therefrom as liquid spray,
   (h) means projecting radially inwardly of at least one of said overhanging portions for defining at least one gutter region in cooperation with said at least one of said overhanging portions wherein cooling liquid ejected from said stationary nozzle means is received and retained under the influence of centrifugal force during operation,
   (i) coolant supply ducts extending from said gutter region through said platform and into at least one unobstructed cavity in each turbine bucket, the cavity volume in said each turbine bucket being open at both ends and extending therethrough along the generally radially extending dimension thereof with at least a portion of the wall structure defining said cavity volume being common to the major portion of the outer walls of said each turbine bucket,
   whereby during operation cooling liquid discharged from said nozzle means is received in said gutter region and is accelerated to about rim velocity with the accelerated liquid being urged under the influence of centrifugal force into and through said coolant supply ducts and said cavity and then expelled from said radially outward end of said turbine bucket.

2. The gas turbine construction substantially as recited in claim 1 wherein each open-ended turbine bucket comprises a structural core having a series of ribs integral therewith projecting from the outer surface thereof and extending along said core in the generally radially outward direction and a thin metal skin forming the outer surface of said turbine bucket, said metal skin being affixed to said ribs and defining a plurality of open-ended unobstructed cavities in flow communication with the coolant supply ducts.

3. The gas turbine construction substantially as recited in claim 1 wherein the turbine buckets are hollow with relatively thin walls presenting the pressure and suction surfaces.

4. The gas turbine construction substantially as recited in claim 3 wherein means are provided within the hollow turbine bucket for insuring the passage during transit through said turbine bucket under the influence of centrifugal force of at least a portion of the outwardly moving cooling liquid adjacent the inner face of the wall presenting the suction surface of said turbine bucket.

5. The gas turbine construction substantially as recited in claim 1 wherein a stationary annular rim projects in the axial direction under at least one overhanging portion of the platform and cooperates with the circumferentially-extending edge of said overhanging portion to more completely define a gutter region.

6. The gas turbine construction substantially as recited in claim 1 wherein the nozzle means are distributed to both sides of the disc and oriented to direct cooling liquid to gutter regions located under both the upstream and the downstream overhanging portions.

7. The gas turbine construction substantially as recited in claim 1 wherein the clearance between the circumferentially-extending edge and the adjacent surface of the stationary structure supporting the nozzle partitions is small enough to substantially prevent the passage of liquid therethrough at operating temperatures.

8. A gas turbine construction comprising in combination:
   (a) a casing,
   (b) a shaft mounted for rotation in said casing,
   (c) a turbine disc mounted on said shaft for rotation therewith, said turbine disc extending substantially perpendicular to the axis of said shaft,
   (d) open-ended turbine buckets mounted on the outer rim of said turbine disc extending in a generally radially outward direction from said rim,
   (e) a shroud interconnecting the radially outward end of the cascade of turbine buckets, the open ends of said turbine buckets venting through said shroud into an annular chamber defined by said casing,
   (f) at least one deflecting vane mounted in said annular chamber extending in the general axial direction and angularly disposed relative to any radius line passing therethrough,
   (g) a platform having overhanging portions projecting laterally to either side of said rim and extending circumferentially of said turbine disc with the upstream circumferentially-extending edge of said overhanging portions being adjacent the surface of the stationary structure supporting the nozzle partitions,
   (h) stationary nozzle means at least some of which are supported by internally located portions of said stationary structure, said nozzle means being located radially inwardly of said platform and being oriented to direct liquid passed therethrough under relatively low pressure in a radially outward direction into the volume generally defined by said stationary structure, turbine disc and overhanging portions,
   (i) means for supplying cooling liquid to said nozzle means for exit therefrom as liquid spray,
   (j) means projecting radially inwardly of at least one of said overhanging portions for defining at least one gutter region in cooperation with said at least one of said overhanging portions wherein cooling liquid ejected from said stationary nozzle means is received and retained under the influence of centrifugal force during operation,
   (k) coolant supply ducts extending from said gutter region through said platform and into at least one unobstructed cavity in each turbine bucket, the cavity volume in said each turbine bucket being open at both ends and extending therethrough along the generally radially extending dimension thereof with at least a portion of the wall structure defining said cavity volume being common to the major portion of the outer walls of said each turbine bucket,
   whereby during operation cooling liquid discharged from said nozzle means is received in said gutter region and is accelerated to about rim velocity with the accelerated liquid being urged under the influence of centrifugal force into and through said coolant supply ducts and said cavity and then expelled from said radially outward end of said turbine bucket through said shroud, some of said liquid striking said deflecting vane and being directed back against said shoud for cooling thereof.

9. The gas turbine construction substantially as recited in claim 8 wherein each open-ended turbine bucket comprises a structural core having a series of ribs integral therewith projecting from the outer surface thereof and extending along said core in the generally radially outward direction and a thin metal skin forming the outer surface of said turbine bucket, said metal skin being affixed to said ribs and defining a plurality of open-ended unobstructed cavities in flow communication with the coolant supply ducts.

10. The gas turbine construction substantially as recited in claim 8 wherein the turbine buckets are hollow with relatively thin walls presenting the pressure and suction surfaces.

11. The gas turbine construction substantially as recited in claim 8 wherein means are provided within the hollow turbine bucket for insuring the unobstructed passage during transit through said turbine bucket under the influence of centrifugal force of at least a portion of the outwardly moving cooling liquid adjacent the inner face of the wall presenting the suction surface of said turbine bucket.

12. The gas turbine construction substantially as recited in claim 8 wherein a stationary annular rim projects in the axial direction under at least one overhanging portion of the platform and cooperates with the circumferentially-extending edge of said overhanging portion to more completely define a gutter region.

13. The gas turbine construction substantially as recited in claim 8 wherein the nozzle means are distributed to both sides of the disc and oriented to direct cooling liquid to gutter regions located under both the upstream and the downstream overhanging portions.

14. The gas turbine construction substantially as recited in claim 8 wherein the clearance between the circumferentially-extending edge and the adjacent surface of the stationary structure supporting the nozzle partitions is small enough to substantially prevent the passage of liquid therethrough at operating temperature.

15. In a gas turbine wherein a turbine disc is mounted on a shaft rotatably supported in a casing, said turbine disc extending substantially perpendicular to the axis of said shaft and having turbine buckets affixed to the outer rim thereof for receiving a driving force from a hot motive fluid moving in a direction generally parallel to said axis of said shaft, the driving force being transmitted to said shaft via said turbine disc, the improvement comprising in combination:
(a) the outer rim comprising a platform section extending circumferentially of the turbine disc and formed integrally therewith,
   (1) said platform section having overhanging portions projecting laterally to either side of said turbine disc,
(b) the turbine buckets each having at least one unobstructed cavity extending therethrough along the generally radially extending dimension thereof with at least a portion of the wall structure defining said cavity volume being common to most of the outer wall structure of said turbine buckets,
   (1) each of said cavities venting near both ends thereof through said turbine buckets,
(c) passageways formed in said overhanging portions opening through the undersurface thereof and in flow communication with said cavities.

16. The improvement substantially as recited in claim 15 wherein at least some of the passageways directly vent through the undersurface of the overhanging portions at one end thereof and vent into the unobstructed cavities at the other end thereof.

17. In a process for cooling the open-ended turbine buckets of a gas turbine during operation thereof by the introduction of cooling fluid into the interior of said turbine buckets, the improvement comprising the step of discharging fluid consisting essentially of a cooling liquid in the generally radially outward direction into an annular region within the turbine, said annular region being defined in part by an outer surface of the rotating turbine disc and in part by the rotating circumferentially-extending undersurface of an overhanging portion of the platform structure and said annular region further being in flow communication with the interior of said turbine buckets for unobstructed passage of the cooling liquid over the inside surfaces of the major portion of the outer walls of said turbine buckets.

18. The improved process substantially as recited in claim 17 wherein the cooling liquid is water.

References Cited

UNITED STATES PATENTS

| 1,824,893 | 9/1931 | Holzwarth. |
| 2,786,646 | 3/1957 | Grantham _____ 253—39.15 |
| 2,888,241 | 5/1959 | Stalker. |

EVERETTE A. POWELL, JR., *Primary Examiner.*

U.S. Cl. X.R.

253—77